(12) United States Patent
Han et al.

(10) Patent No.: US 11,972,046 B1
(45) Date of Patent: Apr. 30, 2024

(54) HUMAN-MACHINE INTERACTION METHOD AND SYSTEM BASED ON EYE MOVEMENT TRACKING

(71) Applicant: Vantronics (Hangzhou) Intelligent Technology Co. LTD., Hangzhou (CN)

(72) Inventors: Hailiang Han, Hangzhou (CN); Vincent Jiang, Chandler, AZ (US)

(73) Assignees: Vincent Jiang, Chandler, AZ (US); Vantronics (Hangzhou) Intelligent Technology Co. LTD., Hangzhou (CN)

( * ) Notice: Subject to any disclaimer, the term of this patent is extended or adjusted under 35 U.S.C. 154(b) by 0 days.

(21) Appl. No.: 18/156,366

(22) Filed: Jan. 18, 2023

(30) Foreign Application Priority Data

Nov. 3, 2022 (CN) .......................... 202211371978.X

(51) Int. Cl.
*G06F 3/01* (2006.01)
*G06F 3/04845* (2022.01)
*G06F 3/0485* (2022.01)

(52) U.S. Cl.
CPC .............. *G06F 3/013* (2013.01); *G06F 3/017* (2013.01); *G06F 3/04845* (2013.01); *G06F 3/0485* (2013.01); *G06F 2203/04806* (2013.01)

(58) Field of Classification Search
CPC ...... G06F 3/013; G06F 3/017; G06F 3/04845; G06F 3/0485; G06F 2203/04806
See application file for complete search history.

(56) References Cited

U.S. PATENT DOCUMENTS

| | | | |
|---|---|---|---|
| 7,113,170 B2* | 9/2006 | Lauper | G06F 3/013 345/158 |
| 8,594,374 B1* | 11/2013 | Bozarth | G06V 40/19 382/103 |
| 8,786,953 B2* | 7/2014 | Wheeler | G02B 27/0172 359/13 |
| 9,423,870 B2* | 8/2016 | Teller | G10L 15/22 |
| 9,454,225 B2* | 9/2016 | Bychkov | G06F 3/011 |
| 10,317,995 B2* | 6/2019 | Lannsjö | G06F 3/0485 |
| 10,515,270 B2* | 12/2019 | Mese | G06F 3/0304 |
| 10,732,721 B1* | 8/2020 | Clements | B66B 1/468 |
| 2002/0105482 A1* | 8/2002 | Lemelson | G06F 3/013 345/32 |

(Continued)

*Primary Examiner* — Benyam Ketema
(74) *Attorney, Agent, or Firm* — George Guosheng Wang; Upstream Research and Patent LLC

(57) ABSTRACT

The present disclosure discloses a human-machine interaction method and system based on eye movement tracking. The human-machine interaction method comprises the following steps: acquiring first eye movement information of a user on a current display interface; executing a first operation command on the current display interface based on the first eye movement information; acquiring second eye movement information of the user on the current display interface under the first operation command; executing a second operation command on the current display interface under the first operation command based on the second eye movement information; acquiring third eye movement information of the user on the current display interface under the second operation command; locking or unlocking the second operation command based on the third eye movement information; and repeating the above process until the user finishes human-machine interaction.

9 Claims, 5 Drawing Sheets

(56) References Cited

U.S. PATENT DOCUMENTS

| | | | |
|---|---|---|---|
| 2002/0176604 A1* | 11/2002 | Shekhar | G06T 7/246 382/104 |
| 2006/0256083 A1* | 11/2006 | Rosenberg | G06F 3/013 345/156 |
| 2007/0164990 A1* | 7/2007 | Bjorklund | G06F 3/017 345/156 |
| 2012/0272179 A1* | 10/2012 | Stafford | G06F 3/0482 345/157 |
| 2013/0135196 A1* | 5/2013 | Park | G06T 11/001 348/78 |
| 2013/0169560 A1* | 7/2013 | Cederlund | G06F 3/013 345/173 |
| 2013/0190044 A1* | 7/2013 | Kulas | G06F 3/041 455/556.1 |
| 2013/0283208 A1* | 10/2013 | Bychkov | G06F 3/0425 715/810 |
| 2013/0300654 A1* | 11/2013 | Seki | G06F 3/013 345/156 |
| 2014/0049462 A1* | 2/2014 | Weinberger | G06F 3/013 345/156 |
| 2014/0247210 A1* | 9/2014 | Henderek | G06F 3/0227 345/156 |
| 2014/0268054 A1* | 9/2014 | Olsson | G06F 1/1686 351/209 |
| 2015/0009238 A1* | 1/2015 | Kudalkar | G09G 5/373 345/661 |
| 2015/0082180 A1* | 3/2015 | Ames | G06F 3/04815 715/849 |
| 2015/0128075 A1* | 5/2015 | Kempinski | G06F 3/012 715/765 |
| 2015/0149956 A1* | 5/2015 | Kempinski | G06F 3/0485 715/784 |
| 2015/0212576 A1* | 7/2015 | Ambrus | G06F 3/0482 345/156 |
| 2015/0301595 A1* | 10/2015 | Miki | G06F 3/041 715/847 |
| 2015/0331240 A1* | 11/2015 | Poulos | G02B 27/017 345/8 |
| 2015/0370323 A1* | 12/2015 | Cieplinski | H04N 21/4852 345/156 |
| 2016/0231812 A1* | 8/2016 | Hansen | G06F 3/04847 |
| 2016/0357266 A1* | 12/2016 | Patel | G06F 3/0482 |
| 2017/0083088 A1* | 3/2017 | Lannsjö | G06F 3/0485 |
| 2017/0115736 A1* | 4/2017 | Patel | G06F 3/013 |
| 2017/0139567 A1* | 5/2017 | Li | G06F 3/017 |
| 2017/0163866 A1* | 6/2017 | Johnson | G06F 3/011 |
| 2018/0095636 A1* | 4/2018 | Valdivia | G06F 3/0482 |
| 2018/0181272 A1* | 6/2018 | Olsson | G06F 3/0485 |
| 2019/0362557 A1* | 11/2019 | Lacey | G06T 19/006 |
| 2020/0026349 A1* | 1/2020 | Fontanel | G06V 20/20 |
| 2020/0225746 A1* | 7/2020 | Bar-Zeev | G06F 3/013 |
| 2020/0371673 A1* | 11/2020 | Faulkner | G06F 3/017 |
| 2021/0096726 A1* | 4/2021 | Faulkner | G06F 1/1686 |
| 2022/0100270 A1* | 3/2022 | Pastrana Vicente | G06F 3/04842 |
| 2023/0092874 A1* | 3/2023 | Krivoruchko | G06F 3/04845 715/849 |
| 2023/0280894 A1* | 9/2023 | Xiong | G06F 3/0482 715/764 |
| 2023/0281901 A1* | 9/2023 | Oz | G06T 7/20 345/419 |

* cited by examiner

HUMAN-MACHINE INTERACTION METHOD AND SYSTEM BASED ON EYE MOVEMENT TRACKING

BACKGROUND

Technical Field

The present disclosure relates to a human-machine interaction method based on eye movement tracking, also relates to a corresponding human-machine interaction system, and belongs to the technical field of human-machine interaction.

Related Art

Currently, there are still many people who cannot directly operate computers easily due to physical disability and the like, in addition, the range of activity of this population is relatively small under the limitation of the physical factor, and thus the computers become important tools for them to carry out external communication.

For the above demand, since 1960s to 1970s, U.S. Pat. Nos. 3,462,604, 4,109,145, 3,986,030, 3,507,988, 4,651,145 and other United States Patents successively put forward many systems capable of controlling computers or peripheral devices through eye movement. In the later period, Microsoft, IBM and other American corporations as well as Zhejiang University, Anhui University, Alibaba and the like in China all disclosed corresponding research achievements in this aspect, and particularly, after the technology of Virtual Reality (VR) rises, new research achievements emerge in endlessly. For example, in a PCT international application with the publication number of WO2010/085527, Alcatel-Lucent provided an eye movement tracking apparatus and a processor. The eye movement tracking apparatus can detect orientations of eyeballs towards a visual display unit. The processor is in communication with the visual display unit and an eyeball tracking apparatus. The processor can make a cursor be displayed on the visual display unit. The processor can execute a cursor command from a plurality of cursor commands to respond to a detected orientation of eyeballs towards a portion of the displayed cursor. A corresponding method includes executing the cursor command in the plurality of cursor commands to respond to the detected eyeball orientation.

But eye movement interaction mechanisms in the prior art usually take blink input or gaze input as an input manner. However, the current eye movement interaction mechanisms still have many defects such as low efficiency, high error rate, frequent eyestrain and poor control sense, resulting in that the application field of an eye movement interaction technology still cannot be enlarged, and application prospects of the eye movement interaction technology is limited.

SUMMARY

The primary technical problem to be solved by the present disclosure is to provide a human-machine interaction method based on eye movement tracking.

Another technical problem to be solved by the present disclosure is to provide a human-machine interaction system based on eye movement tracking.

To achieve the foregoing technical objective, the present disclosure adopts the following technical solutions.

According to a first aspect of embodiments of the present disclosure, a human-machine interaction method based on eye movement tracking is provided, which comprises following steps:

acquiring first eye movement information of a user on a current display interface, the first eye movement information including first gaze information or a first glance track;

executing a first operation command on the current display interface based on the first eye movement information;

acquiring second eye movement information of the user on the current display interface under the first operation command, the second eye movement information including second gaze information or a second glance track;

executing a second operation command on the current display interface under the first operation command based on the second eye movement information;

acquiring third eye movement information of the user on the current display interface under the second operation command;

locking or unlocking all the operation commands based on the third eye movement information; and repeating the above process until the user finishes human-machine interaction.

According to a second aspect of the embodiments of the present disclosure, a human-machine interaction system based on eye movement tracking is provided, which comprises:

a display screen, configured to perform image display;

an eye movement tracking apparatus, configured to acquire eye movement information of a user, the eye movement information including first eye movement information on a current display interface, second eye movement information on the current display interface under a first operation command, and third eye movement information on the current display interface; and a processor, being in communication connection with the display screen and the eye movement tracking apparatus to execute the first operation command on the current display interface of the display screen according to the first eye movement information, to execute a second operation command on the current display interface of the display screen according to the second eye movement information, and further to lock or unlock all the operation commands on the current display interface of the display screen according to the third eye movement information.

Compared with the prior art, the present disclosure has the following technical effects.

1. Through cooperation of the first operation command and the second operation command, the current display interface can be enlarged and accurately clicked, the current display interface can be scrolled, the current display interface can be zoomed, and the like. In addition, in the whole operation realizing process, the user can realize operation like able-bodied persons only by means of eyes without using the hands, the speed and convenience degree are similar to ordinary person operation, and the operation convenience degree and operation speed are greatly increased.

2. A brand new "eye gesture" operation manner avoids shielding of desktop contents by button operation menus and improves the user operation experience.

3. Unique eye gesture operation is designed, and operation functions are locked or unlocked through the third eye movement information, so as to avoid mistaken operation command triggering when the user watches videos or works for a long time.

DETAILED DESCRIPTION

The technical content of the present disclosure is described in detail below with reference to the accompanying drawings and specific embodiments.

Embodiment 1

Figure 1:
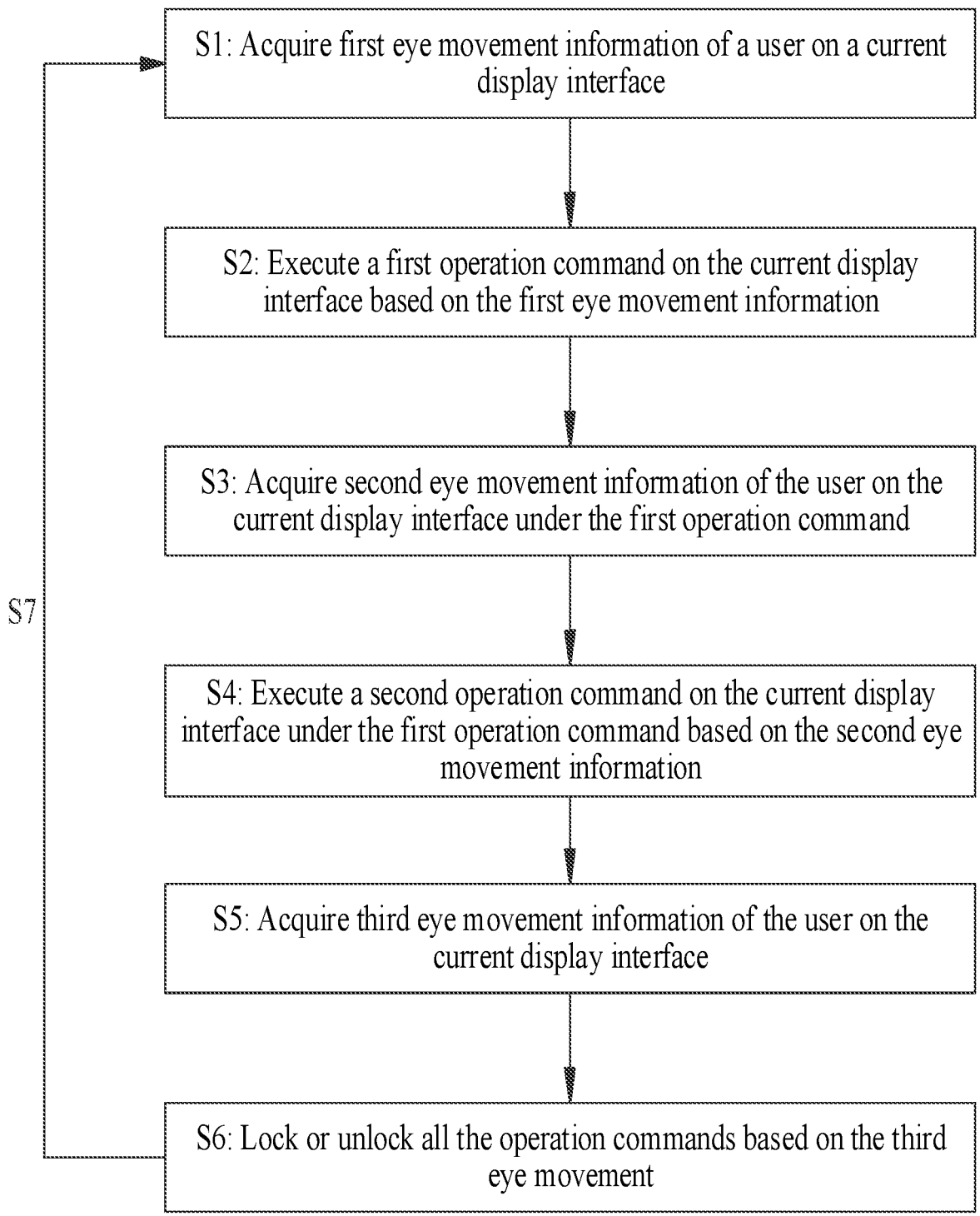
FIG. 1 is a flowchart of a human-machine interaction method based on eye movement tracking provided by Embodiment 1 of the present disclosure.

As shown in FIG. 1, Embodiment 1 of the present disclosure provides a human-machine interaction method based on eye movement tracking, which specifically includes steps S1-S7:

S1: Acquire first eye movement information of a user on a current display interface.

In the present embodiment, the first eye movement information includes first gaze information or a first glance track. The first gaze information refers to that a sight line of the user continuously gazes at a certain area of the current display interface for a preset duration, and the first glance track refers to that the sight line of the user glances at an interest area of the current display interface at least twice.

Figure 2:
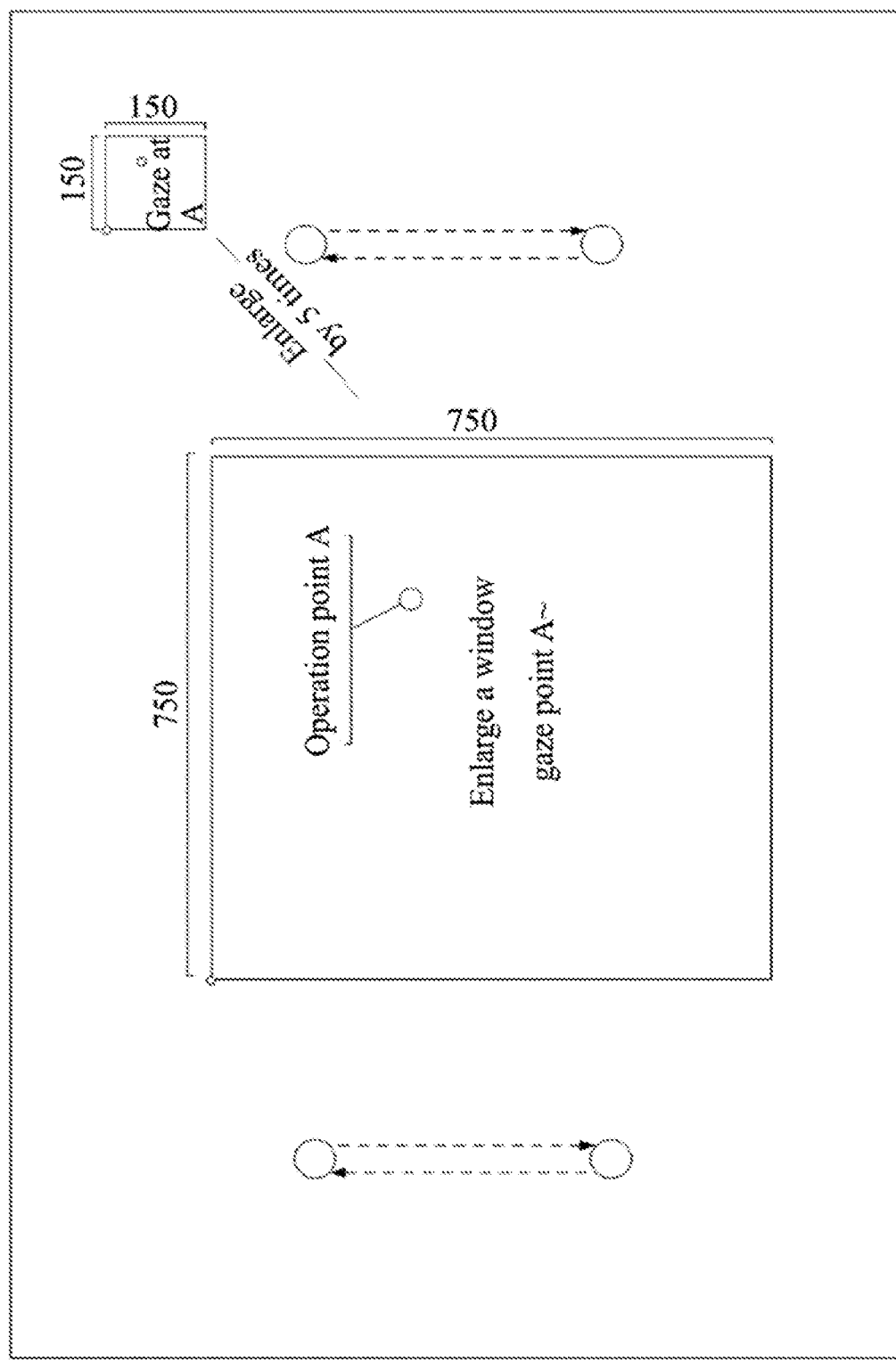
FIG. 2 is a schematic operation diagram of an interface enlarging command according to Embodiment 1 of the present disclosure.

Specifically, when the user continuously gazes at a certain area of the current display interface for a preset duration (e.g., 1500 ms), it indicates that the user is interested in the area, the area is defined as an initial gaze area of the user at the time, and the initial gaze area is taken as the first gaze information of the user. For example, as shown in FIG. 2, the initial gaze area may be a 150×150 mm rectangular area formed with a point A at which the user continuously gazes as a center, or a circular area with a diameter of 150 mm formed with a point A at which the user continuously gazes as a center, and the like.

However, it is to be understood that when the sight line of the user glances at the interest area of the current display interface, the user may glance up and down or left and right, and an up-down glance track or a left-right glance track of the user is taken as the first glance track of the user.

Accordingly, different operation demands of the user can be acquired based on different actions of eyeballs of the user.

S2: Execute a first operation command on the current display interface based on the first eye movement information.

After the eyeball action of the user is acquired in step S1, the first operation command can be executed on the current display interface based on functions pre-configured by a system to respond to the first eye movement information of the user. In the present embodiment, the first operation command may include an interface enlarging command, an interface scrolling command and an interface zooming command.

Specifically, as shown in FIG. 2, in the present embodiment, when the first eye movement information acquired in step S1 is the first gaze information, the first operation command is the interface enlarging command. During specific operation, the initial gaze area needs to be enlarged (by 5 times in the present embodiment or other multiples) and then moved to a center of a screen; then, the sight line of the user gazes at an enlarged area at the center of the screen for fine secondary operation, locks a mouse pointer operation location after continuously gazing at the interest area for 1500 ms, and then moves a mouse to the point after coordinate conversion and locks the location of the mouse. Accordingly, on one hand, the user is assisted in positioning a fine gaze area by the enlarged area; and on the other hand, an eye movement tracking apparatus is different in precision for different areas on the screen, poor in precision for a periphery of the screen and high in precision for a center position of the screen, and thus, moving the enlarged area to the center of the screen can improve positioning precision of the eye movement tracking apparatus.

When the first eye movement information acquired in step S1 is the up-down glance track, the first operation command is the interface scrolling command. During specific operation, when the sight line of the user glances at the interest area in the screen up and down for 2 or more cycles, in the process, the sight line is kept to move up and down in a vertical direction as much as possible, and a maximum deviation angle in the vertical direction is less than 20 degrees. A maximum distance of eyes glancing at the screen cannot exceed ¾ pixel of a height of the screen, and a minimum distance cannot be less than ¼ pixel of the height of the screen. Accordingly, a mouse wheel scroll operation is triggered based on the up-down glance track of the user, and the current display interface can be scrolled in a scroll operation mode by further acquiring second eye movement information (refer to step S3) of the user.

Similarly, when the first eye movement information acquired in step S1 is the left-right glance track, the first operation command is the interface zooming command. During specific operation, when the sight line of the user glances at the interest area in the screen left and right for 2 or more cycles, at the time, the sight line is kept to move left and right in a horizontal direction as much as possible, and a maximum deviation angle in the horizontal direction is less than 20 degrees. A maximum distance of the eyes glancing at the screen cannot exceed ⅔ pixel of a width of the screen, and a minimum distance cannot be less than ⅙ pixel of the width of the screen. Accordingly, a Ctrl+mouse wheel scroll operation is triggered based on the left-right glance track of the user, and the current display interface (e.g., a picture or a certain page) can be zoomed in a Ctrl+mouse wheel scroll operation mode by further acquiring the second eye movement information (refer to step S3) of the user.

S3: Acquire the second eye movement information of the user on the current display interface under the first operation command.

After the first operation command is executed in step S2, the second eye movement information of the user needs to be further acquired to acquire an operation intention of the user, thereby executing a next operation based on the operation intention of the user. In the present embodiment, the second eye movement information includes second gaze information or a second glance track, where the first gaze information in step S1 is used in cooperation with the second glance information in step S3, and the first glance information in step S1 is used in cooperation with the second gaze information in step S3.

Figure 3:
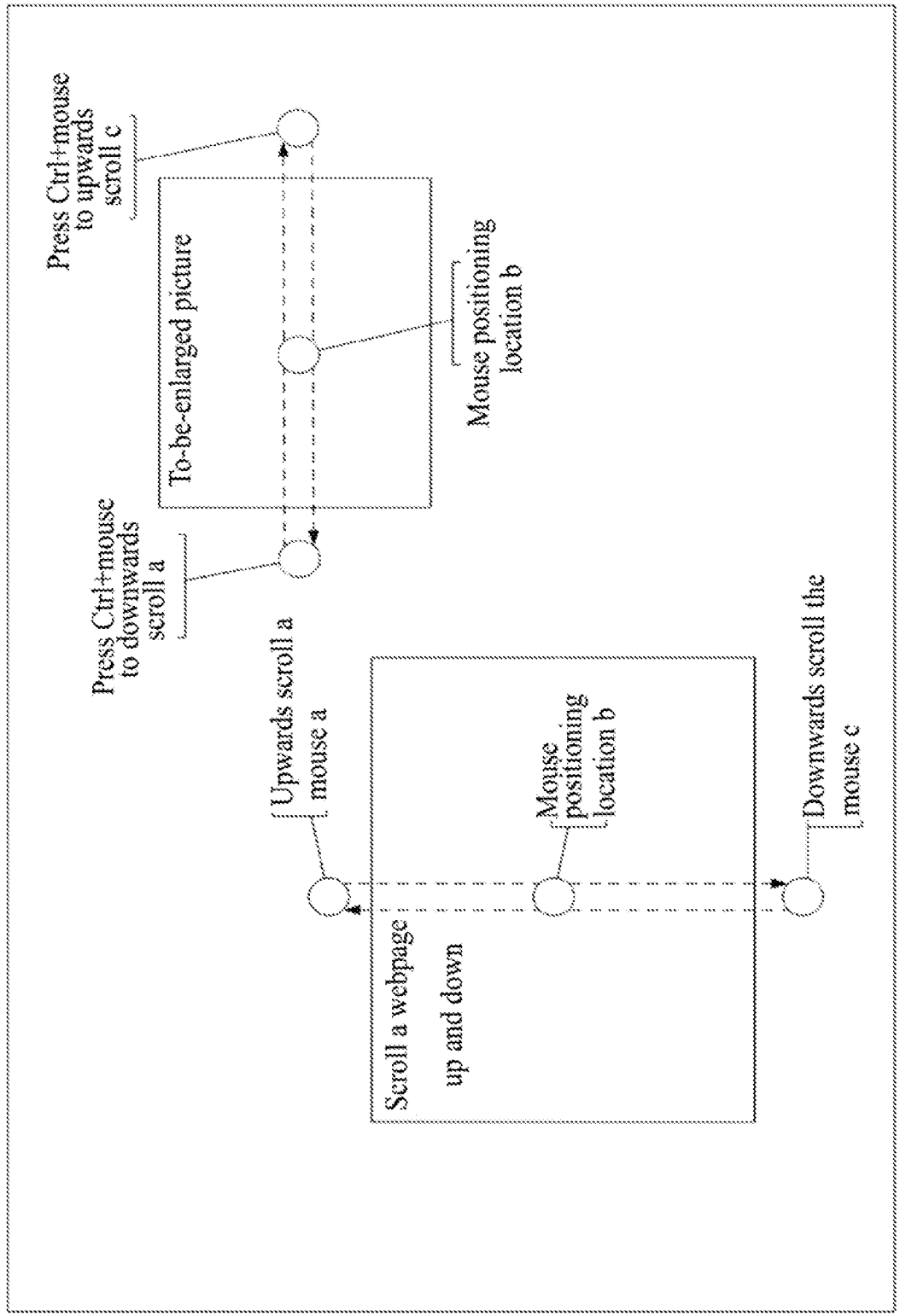
FIG. 3 is a schematic operation diagram of interface scrolling or interface zooming according to Embodiment 1 of the present disclosure.

Specifically, as shown in FIG. 3, in the present embodiment, when the first eye movement information in step S1 is the first gaze information, the second glance track of the user in the enlarged initial gaze area needs to be acquired in step S3 to serve as the second eye movement information. The second glance track includes one of four glance tracks including: one-time up-down glance at a left side of the screen, two-time up-down glance at the left side of the screen, one-time up-down glance at a right side of the screen and two-time up-down glance at the right side of the screen.

When the first eye movement information in step S1 is the first glance track, the second gaze information of the sight line of the user on the current display interface needs to be acquired in step S3 to serve as the second eye movement information. The second gaze information includes one of the following: the sight line staying at a top area of the up-down glance track, the sight line staying at a bottom area of the up-down glance track, the sight line staying at a left area of the left-right glance track and the sight line staying at a right area of the left-right glance track.

Accordingly, different operation demands of the user can be acquired again based on different actions of the eyeballs of the user.

S4: Execute a second operation command on the current display interface under the first operation command based on the second eye movement information.

After the eyeball action of the user is acquired again in step S3, the second operation command can be executed on the current display interface under the first operation command based on the functions pre-configured by the system to respond to the second eye movement information of the user. In the present embodiment, the second operation command specifically includes: a mouse left click command, a mouse left double-click command, a mouse right click command, a mouse right double-click command, a display interface scroll-up command, a display interface scroll-down command, a display interface enlarging command and a display interface narrowing command.

In the present embodiment, when the second glance track of the user in the enlarged initial gaze area is acquired in step S3, a specific glance location and a glance frequency of the second glance track need to be determined. Specifically, when the second glance track is the sight line of the user glancing at the left side of the screen up and down once, a glance distance cannot be less than ⅓ pixel of the height of the screen, the mouse left click command is triggered at the time, and if glance is performed twice or more times, the mouse left double-click command is triggered. Similarly, when the second glance track is the sight line of the user glancing at the right side of the screen up and down once, the glance distance cannot be less than ⅓ pixel of the height of the screen, the mouse right click command is triggered at the time, and if glance is performed twice or more times, the mouse right double-click command is triggered. It can be understood that a mouse operation point at the time is located at a mouse location locked in step S2.

When the second gaze information of the sight line of the user on the current display interface is acquired in step S3, a specific gaze position of the second gaze information needs to be determined. Specifically, when the second gaze information is the sight line of the user staying at the top area of the up-down glance track, a mouse wheel scroll-up operation is triggered to upwards scroll the current display interface; when the second gaze information is the sight line of the user staying at the bottom area of the up-down glance track, a mouse wheel scroll-down operation is triggered to downwards scroll the current display interface; and if the sight line moves again, the mouse wheel scroll is stopped. When the second gaze information is the sight line of the user staying at the left area of the left-right glance track, a ctrl+mouse wheel scroll-down operation is executed to narrow the current display interface; when the second gaze information is the sight line of the user staying at the right area of the left-right glance track, a ctrl+mouse wheel scroll-up operation is triggered to enlarge the current display interface; and if the sight line moves again, the ctrl+mouse wheel scroll operation is stopped.

It can be known that in the present embodiment, through cooperation of the first operation command and the second operation command, the current display interface can be enlarged and accurately clicked, the current display interface can be scrolled, the current display interface can be zoomed, and the like. In addition, in the whole operation realizing process, the user can realize operation like able-bodied persons only by means of eyes without using the hands, the speed and convenience degree are similar to ordinary person operation, and the operation convenience degree and operation speed are greatly increased.

S5: Acquire third eye movement information of the user on the current display interface.

Considering that the user needs to gaze at a certain area for a long time when watching videos or doing some work, to avoid mistaken operation command triggering, an eye gesture operation (namely the third eye movement information) is designed in the present embodiment for locking the functions involved in step S2 to step S4.

Figure 4:
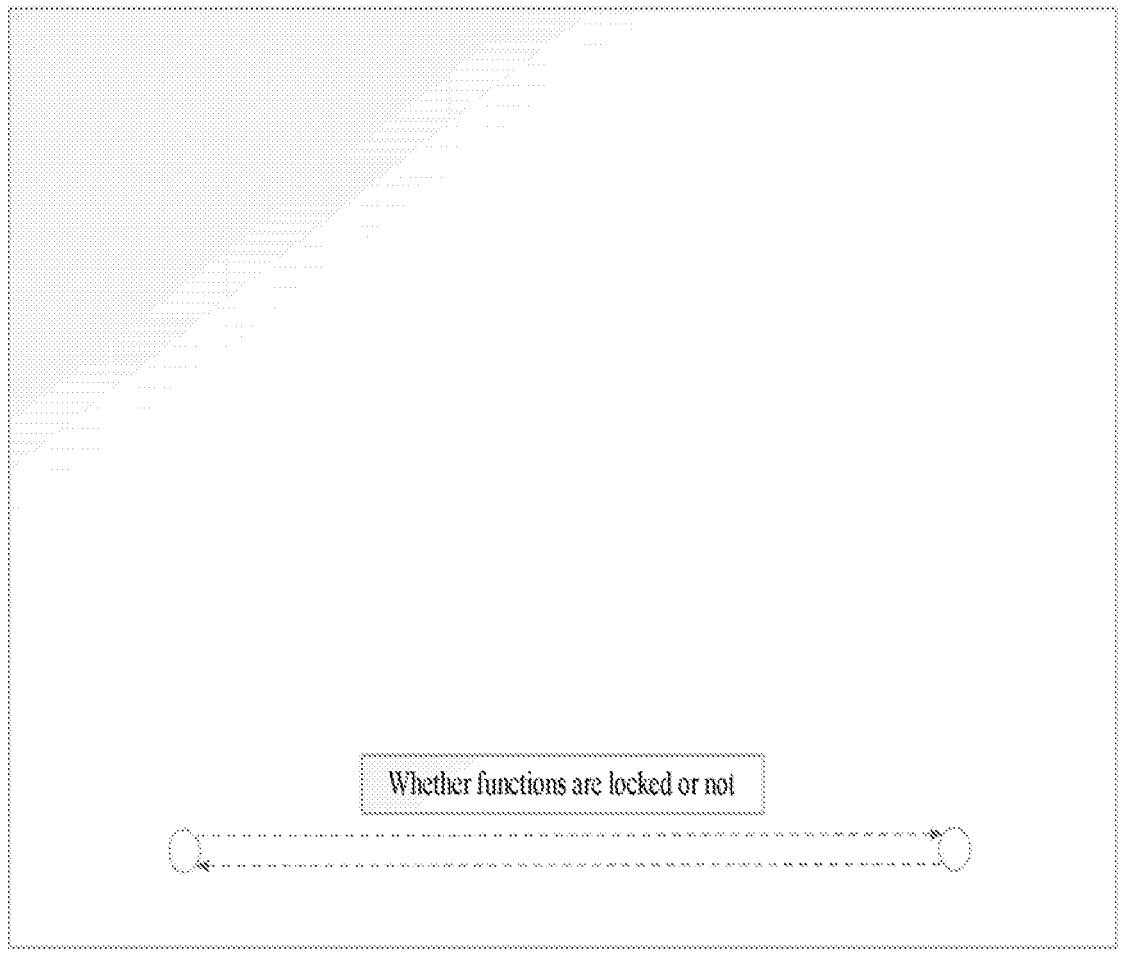
FIG. 4 is a schematic operation diagram of function locking or unlocking according to Embodiment 1 of the present disclosure.

Specifically, as shown in FIG. 4, in the present embodiment, the third eye movement information includes left-right glance at the bottom area of the current display interface twice or more times.

Accordingly, whether the user needs to lock or unlock all the operation or not can be acquired by acquiring the third eye movement information.

S6: Lock or unlock all the operation commands based on the third eye movement information.

When the third eye movement information of the user is acquired in step S5 (namely, the sight line of the user glances at the bottom area of the current display interface left and right twice or more times), if the current display interface is in an unlocking state at the time, a locking operation is triggered, and a locking pop-up window pops up so that the user can confirm whether the current display interface needs to be locked or not. After the user performs confirmation, all the operation commands are locked, and at the time, any operation of the eyeballs cannot influence the current display interface.

On the contrary, when the third eye movement information of the user is acquired in step S5 (namely, the sight line of the user glances at the bottom area of the current display interface left and right twice or more times), if all the operation commands are in a locking state at the time, an unlocking operation is triggered, and an unlocking pop-up window pops up so that the user can confirm whether unlocking is needed or not. After the user performs confirmation, all the operation commands are unlocked, and the current display interface is operated again based on step S2 to step S4 at the time.

S7: Repeat the above process until the user finishes human-machine interaction.

It can be understood that the user needs to trigger multiple times of operation in the process of one-time human-machine interaction, namely, step S2 to step S4 may be triggered multiple times, and thus, after the user finishes one-time human-machine interaction, step S2 to step S4 can be repeated to meet different usage requirements until the user finishes the current human-machine interaction process.

Embodiment 2

Figure 5:
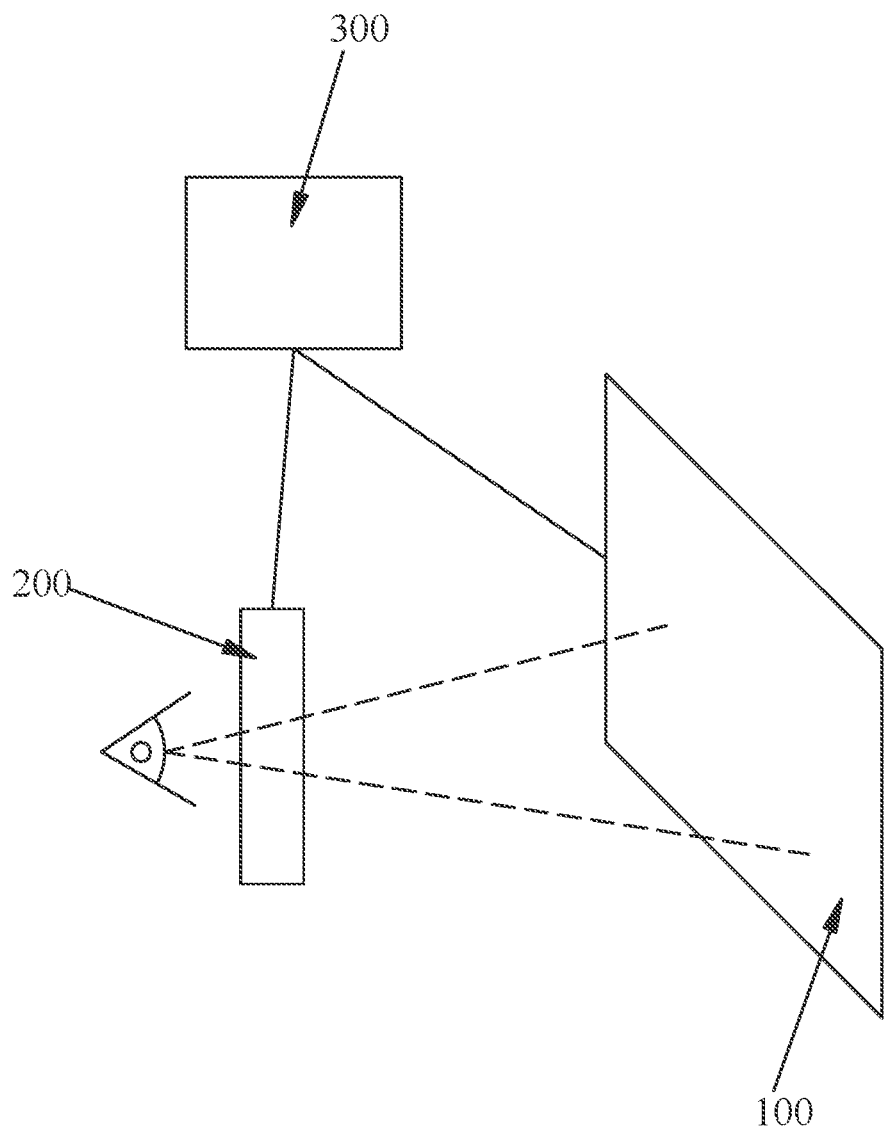
FIG. 5 is a structure diagram of a human-machine interaction system based on eye movement tracking provided by Embodiment 2 of the present disclosure.

As shown in FIG. 5, on the basis of Embodiment 1, Embodiment 2 of the present disclosure further provides a human-machine interaction system based on eye movement tracking, which includes a display screen 100, an eye movement tracking apparatus 200 and a processor 300. The display screen 100 is configured to display images to perform human-machine interaction with a user; the eye movement tracking apparatus 200 is configured to acquire eye movement information of the user; and the processor 300 is in communication connection with the display screen 100 and the eye movement tracking apparatus 200 to execute corresponding operation commands on the display screen 100 based on the eye movement information acquired by the eye movement tracking apparatus 200, thereby finishing the human-machine interaction process.

Specifically, the display screen 100 may be a display screen of a computer, and may also be an LED, LCD or other liquid crystal display screens, and the display screen 100 can display a mouse cursor besides displaying images, thereby performing click or double-click operations in an image display area through the mouse cursor. The eye movement information of the user acquired by the eye movement tracking apparatus 200 includes the first eye movement information, the second eye movement information and the third eye movement information in Embodiment 1. The processor 300 pre-configures the operation commands to execute a first operation command on a current display interface of the display screen according to the first eye movement information, to execute a second operation command on the current display interface of the display screen according to the second eye movement information, and further to lock or unlock all the operation commands on the current display interface of the display screen according to the third eye movement information.

In a typical human-machine interaction process, the processor 300 is configured to: acquire an initial gaze area of the user when a sight line of the user continuously gazes at the current display interface for a preset duration (e.g., 1500 ms); enlarge and move the initial gaze area to a center of the screen to determine a fine gaze area of the user; acquire a second glance track of the user in the enlarged initial gaze area to execute one of a mouse left click operation, a mouse left double-click operation, a mouse right click operation and a mouse right double-click operation, where the second glance track includes one of one-time up-down glance at a left side of the screen, two-time up-down glance at the left side of the screen, one-time up-down glance at a right side of the screen and two-time up-down glance at the right side of the screen; and acquire a glance track of two-time left-right glance of the user at a bottom area of the current display interface as the third eye movement information to lock or unlock all the operation commands.

In another typical human-machine interaction process, the processor 300 is configured to: when the sight line of the user glances at an interest area of the current display interface up and down twice, execute a mouse wheel scroll operation on the current display interface; when the sight line of the user stays at a top area of an up-down glance track, execute a mouse wheel scroll-up operation on the current display interface to upwards scroll the current display interface; when the sight line of the user stays at a bottom area of the up-down glance track, execute a mouse wheel scroll-down operation on the current display interface to downwards scroll the current display interface; when the sight line of the user moves again, stop the mouse wheel scroll operation; and acquire the glance track of two-time left-right glance of the user at the bottom area of the current display interface as the third eye movement information to lock or unlock all the operation commands.

In another typical human-machine interaction process, the processor 300 is configured to: when the sight line of the user glances at the interest area of the current display interface left and right twice, execute a ctrl+mouse wheel scroll operation on the current display interface; when the sight line of the user stays at a left area of a left-right glance track, execute a ctrl+mouse wheel scroll-down operation on the current display interface to narrow the current display interface; when the sight line of the user stays at a right area of the left-right glance track, execute a ctrl+mouse wheel scroll-up operation on the current display interface to enlarge the current display interface; when the sight line of the user moves again, stop the mouse wheel scroll operation; and acquire the glance track of two-time left-right glance of the user at the bottom area of the current display interface as the third eye movement information to lock or unlock all the operation commands.

Embodiment 3

A computer readable medium is provided in Embodiment 3 of the present disclosure. The computer readable medium includes computer codes executed by a human-machine interaction system. The human-machine interaction system includes a visual display unit 100, an eye movement tracking apparatus 200 and a processor 300 communicated with the visual display unit and the eye movement tracking apparatus. The computer codes are executable to enable the system to execute steps of the human-machine interaction method in Embodiment 1: acquire first eye movement information of a user on a current display interface, the first eye movement information including first gaze information or a first glance track; execute a first operation command on the current display interface based on the first eye movement information; acquire second eye movement information of the user on the current display interface under the first operation command, the second eye movement information including second gaze information or a second glance track; execute a second operation command on the current display interface under the first operation command based on the second eye movement information; acquire third eye movement information of the user on the current display interface under the second operation command; lock or unlock the second operation command based on the third eye movement information; and repeat the above process until the user finishes human-machine interaction.

Preferably, the computer readable medium further includes computer codes, and when the computer codes are executed by the human-machine interaction system, other transformation methods of the above human-machine interaction method can be realized. Examples of the computer readable medium include: electrical connection with one or more wires (electronic media), portable computer floppy disk (magnetic media), Random Access Memory (RAM, electronic media), Read Only Memory "ROM" (electronic media), Erasable Programmable Read Only Memory (EPROM or flash memory, electronic media), optical fiber (optical media) and portable CD-Read Only Memory "CDROM" "DVD" (optical media). Furthermore, the computer readable medium may also be paper with computer programs printed thereon or other proper media. The computer programs can be electronically captured, such as by optically scanning the paper or other proper media, and the computer programs can be properly compiled, explained or subjected to other processing in an appropriate manner if necessary, and then stored in a computer memory device.

In one embodiment, the above human-machine interaction system may be used for replacing a conventional computer mouse hardware device. For example, the human-machine interaction system generates a screen computer mouse cursor on the visual display unit 100. For example, the human-machine interaction system may adopt a hardware interface and a software interface the same with the conventional computer mouse hardware device. For example, by means of the human-machine interaction system, hand-free control over the screen computer mouse cursor can be performed more conveniently on the visual display unit 100. Such hand-free control over the screen computer mouse cursor is very useful for some people such as physically-challenged persons, persons hoping to prevent their hands and arms from being strained by repetitive movements, and persons carrying out certain activities and performing hand-free control over the screen computer mouse cursor may facilitate the activities. For another example, compared with the conventional computer mouse hardware device, such hand-free control over the screen computer mouse cursor is faster or more efficient. For example, the human-machine interaction system may also be used in combination with a hand-free keyboard or the conventional computer mouse hardware device. Furthermore, the human-machine interaction system may partially or selectively replace functions of the conventional computer mouse hardware device. For example, the human-machine interaction system may execute part of operations executed by the conventional computer mouse hardware device or the keyboard while other operations are still executed by the conventional computer mouse hardware device or the keyboard. For example, an implementation mode of the human-machine interaction method and the computer readable medium may be similar to related parts discussed in the human-machine interaction system. It can be understood that each feature in various examples of the human-machine interaction system may be selected to be included or excluded by a specific human-machine interaction system finally applied, which is consistent to teachings about each human-machine interaction system and all human-machine interaction systems herein. It can also be understood that various examples of the human-machine interaction system illustrate similar transformation examples of the human-machine interaction method, and thus, all contents of the human-machine interaction system are considered to be included by the human-machine interaction method and the computer readable medium. Similarly, it can also be understood that various examples of the human-machine interaction method illustrate similar transformation examples of the human-machine interaction system, and thus, all contents of the human-machine interaction method are considered to be included by the human-machine interaction system and the computer readable medium.

The human-machine interaction method and system based on eye movement tracking provided by the present disclosure are described in detail above. For a person of ordinary skill in the art, any obvious modifications made to the present disclosure without departing from the essence of the present disclosure will constitute an infringement of patent rights of the present disclosure, and corresponding legal liabilities will be born.

What is claimed is:

1. A human-machine interaction method based on eye movement tracking, comprising the following steps:
   acquiring first eye movement information of a user on a current display interface, the first eye movement information comprising first gaze information or a first glance track;
   executing a first operation command on the current display interface based on the first eye movement information;
   acquiring second eye movement information of the user on the current display interface under the first operation command, the second eye movement information comprising second gaze information or a second glance track;
   executing a second operation command on the current display interface under the first operation command based on the second eye movement information;
   acquiring third eye movement information of the user on the current display interface under the second operation command, the third eye movement information comprises two-time left-right glance at a bottom area of the current display interface;
   locking or unlocking all the operation commands based on the third eye movement information; and
   repeating the above process until the user finishes human-machine interaction.

2. The human-machine interaction method according to claim 1, wherein the acquiring first eye movement information of a user on a current display interface specifically comprises:
   acquiring an initial gaze area of the user as the first gaze information when a sight line of the user continuously gazes at the current display interface for a preset duration; and
   acquiring an up-down glance track or a left-right glance track of the user as the first glance track when the sight line of the user glances at an interest area of the current display interface at least twice.

3. The human-machine interaction method according to claim 2, wherein the executing a first operation command on the current display interface based on the first eye movement information specifically comprises:
   when the first eye movement information is the first gaze information, enlarging and moving the initial gaze area on the current display interface to a center of a screen to determine a fine gaze area of the user;
   when the first eye movement information is the up-down glance track, executing a mouse wheel scroll operation on the current display interface; and
   when the first eye movement information is the left-right glance track, executing a ctrl+mouse wheel scroll operation on the current display interface.

4. The human-machine interaction method according to claim 3, wherein the acquiring second eye movement information of the user on the current display interface under the first operation command specifically comprises:
   when the first eye movement information is the first gaze information, acquiring the second glance track of the user in the enlarged initial gaze area as the second eye movement information, wherein the second glance track comprises one of one-time up-down glance at a left side of the screen, two-time up-down glance at the left side of the screen, one-time up-down glance at a right side of the screen and two-time up-down glance at the right side of the screen; and when the first eye movement information is the first glance track, acquiring the second gaze information of the sight line of the user on the current display interface as the second eye movement information, wherein the second gaze information comprises one of the following: the sight line staying at a top area of the up-down glance track, the sight line staying at a bottom area of the up-down glance track, the sight line staying at a left area of the left-right glance track and the sight line staying at a right area of the left-right glance track.

5. The human-machine interaction method according to claim 4, wherein the executing a second operation command on the current display interface under the first operation command based on the second eye movement information specifically comprises:

when the second glance track is one-time up-down glance at the left side of the screen, executing a mouse left click operation on the current display interface;

when the second glance track is two-time up-down glance at the left side of the screen, executing a mouse left double-click operation on the current display interface;

when the second glance track is one-time up-down glance at the right side of the screen, executing a mouse right click operation on the current display interface;

when the second glance track is two-time up-down glance at the right side of the screen, executing a mouse right double-click operation on the current display interface;

when the second gaze information is the sight line staying at the top area of the up-down glance track, executing a mouse wheel scroll-up operation on the current display interface to upwards scroll the current display interface;

when the second gaze information is the sight line staying at the bottom area of the up-down glance track, executing a mouse wheel scroll-down operation on the current display interface to downwards scroll the current display interface;

when the second gaze information is the sight line staying at the left area of the left-right glance track, executing a ctrl+mouse wheel scroll-down operation on the current display interface to narrow the current display interface; and when the second gaze information is the sight line staying at the right area of the left-right glance track, executing a ctrl+mouse wheel scroll-up operation on the current display interface to enlarge the current display interface.

6. A human-machine interaction system based on eye movement tracking, comprising:

a display screen, configured to perform image display;

an eye movement tracking apparatus, configured to acquire eye movement information of a user, the eye movement information comprising first eye movement information on a current display interface, second eye movement information on the current display interface under a first operation command, and third eye movement information on the current display interface; and a processor, being in communication connection with the display screen and the eye movement tracking apparatus to execute the first operation command on the current display interface of the display screen according to the first eye movement information, to execute a second operation command on the current display interface of the display screen according to the second eye movement information, and further to acquire a glance track of two-time left-right glance of the user at a bottom area of the current display interface as the third eye movement information to lock or unlock all the operation commands.

7. The human-machine interaction system according to claim 6, wherein the processor is configured to:

acquire an initial gaze area of the user when a sight line of the user continuously gazes at the current display interface for a preset duration; and enlarge and move the initial gaze area to a center of the screen to determine a fine gaze area of the user; and acquire a second glance track of the user in the enlarged initial gaze area to execute one of a mouse left click operation, a mouse left double-click operation, a mouse right click operation and a mouse right double-click operation, wherein the second glance track comprises one of one-time up-down glance at a left side of the screen, two-time up-down glance at the left side of the screen, one-time up-down glance at a right side of the screen and two-time up-down glance at the right side of the screen.

8. The human-machine interaction system according to claim 6, wherein the processor is configured to:

when the sight line of the user glances at an interest area of the current display interface up and down twice, execute a mouse wheel scroll operation on the current display interface;

when the sight line of the user stays at a top area of an up-down glance track, execute a mouse wheel scroll-up operation on the current display interface to upwards scroll the current display interface; when the sight line of the user stays at a bottom area of the up-down glance track, execute a mouse wheel scroll-down operation on the current display interface to downwards scroll the current display interface; when the sight line of the user moves again, stop the mouse wheel scroll operation.

9. The human-machine interaction system according to claim 6, wherein the processor is configured to:

when the sight line of the user glances at the interest area of the current display interface left and right twice, execute a ctrl+mouse wheel scroll operation on the current display interface; and when the sight line of the user stays at a left area of a left-right glance track, execute a ctrl+mouse wheel scroll-down operation on the current display interface to narrow the current display interface; when the sight line of the user stays at a right area of the left-right glance track, execute a ctrl+mouse wheel scroll-up operation on the current display interface to enlarge the current display interface; when the sight line of the user moves again, stop the mouse wheel scroll operation.

\* \* \* \* \*